(12) United States Patent
Shakagori et al.

(10) Patent No.: US 7,775,505 B2
(45) Date of Patent: Aug. 17, 2010

(54) BUTTERFLY VALVE HAVING IMPROVED SEALING BETWEEN A SHAFT SEAL PART AND A VALVE DISC

(75) Inventors: Akihiro Shakagori, Nobeoka (JP); Yukinobu Sato, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 351 days.

(21) Appl. No.: 11/887,655

(22) PCT Filed: Mar. 28, 2006

(86) PCT No.: PCT/JP2006/307005
§ 371 (c)(1), (2), (4) Date: Sep. 28, 2007

(87) PCT Pub. No.: WO2006/107005
PCT Pub. Date: Oct. 12, 2006

(65) Prior Publication Data
US 2009/0039305 A1    Feb. 12, 2009

(30) Foreign Application Priority Data
Mar. 31, 2005   (JP) ............................. 2005-104547

(51) Int. Cl.
*F16K 1/226* (2006.01)
(52) U.S. Cl. ...................................... 251/306; 251/308
(58) Field of Classification Search ................. 251/305, 251/306, 307, 308; 123/337; 137/15.25
See application file for complete search history.

(56) References Cited
U.S. PATENT DOCUMENTS 3,376,015 A * 4/1968 Forsman et al. ............. 251/306
3,447,780 A * 6/1969 Hobson, Jr. ................. 251/306
3,537,683 A * 11/1970 Snell, Jr. .................... 251/306
3,589,678 A * 6/1971 Magoon ..................... 251/306
3,782,684 A * 1/1974 Stephens et al. ............ 251/306
3,940,108 A * 2/1976 Edwards .................... 251/306
4,241,897 A * 12/1980 Maezawa ................... 251/306

(Continued)

FOREIGN PATENT DOCUMENTS

JP        55-119457 U     8/1980

(Continued)

OTHER PUBLICATIONS

International Search Report for PCT/JP2006/307005, dated Jun. 20, 2006.

*Primary Examiner*—John Bastianelli
(74) *Attorney, Agent, or Firm*—Buchanan Ingersoll & Rooney PC (57) ABSTRACT

A butterfly valve includes a seat ring fitted to an inner peripheral surface of a hollow cylindrical valve body, and a discal valve disc in which a shaft is mounted. The shaft is rotatably mounted in through-holes of the seat ring. An annular protrusion having a first tapered surface inclined at 20°-40° with respect to the valve axis is formed at the peripheral edge of each of the through holes of the seat ring. A bowl-shaped annular depression at each end of the valve shaft hole includes a second tapered surface inclined at 25°-45° with respect to the axis and engaged with a respective first tapered surface.

7 Claims, 11 Drawing Sheets

U.S. PATENT DOCUMENTS

| | | | |
|---|---|---|---|
| 4,317,558 A * | 3/1982 | Sherlaw | 251/306 |
| 4,510,965 A * | 4/1985 | Peroux et al. | 251/305 |
| 4,653,724 A * | 3/1987 | Garrigues et al. | 251/306 |
| 4,998,708 A * | 3/1991 | Pavanel | 251/306 |
| 5,695,170 A * | 12/1997 | Dernovsek et al. | 251/305 |

FOREIGN PATENT DOCUMENTS

| | | | |
|---|---|---|---|
| JP | 55-144255 U | 10/1980 | |
| JP | 3-2063 Y2 | 1/1991 | |
| JP | 2002-89740 A | 3/2002 | |
| JP | 3389542 B2 | 1/2003 | |
| JP | 2003-329150 A | 11/2003 | |
| JP | 2004-150595 A | 5/2004 | |

* cited by examiner

PRIOR ART

BUTTERFLY VALVE HAVING IMPROVED SEALING BETWEEN A SHAFT SEAL PART AND A VALVE DISC

BACKGROUND OF THE INVENTION

1. Field of the Invention

This invention relates to a butterfly valve that can be suitably used for pipe lines in chemical plants, water supply and sewage systems, agriculture and fishery. In particular, the invention relates to a butterfly valve in which a valve disc of the butterfly valve is displaced by fluid pressure when the valve is closed, leakage in the valve disc with the fluid leaking into the gap between the valve shaft hole and the stem of the valve disc is prevented while at the same time preventing fluid leakage from the shaft seal part between the stem and the through holes of a seat ring, and wherein the operation torque of the stem is not increased and no fluid leaks from the shaft seal part or the sealed part between the valve disc and the neighborhood of the through holes of the seat ring or the downstream side of the valve after continuous on/off (open/close) operation over a long period of time.

2. Description of the Related Art

Figure 8:
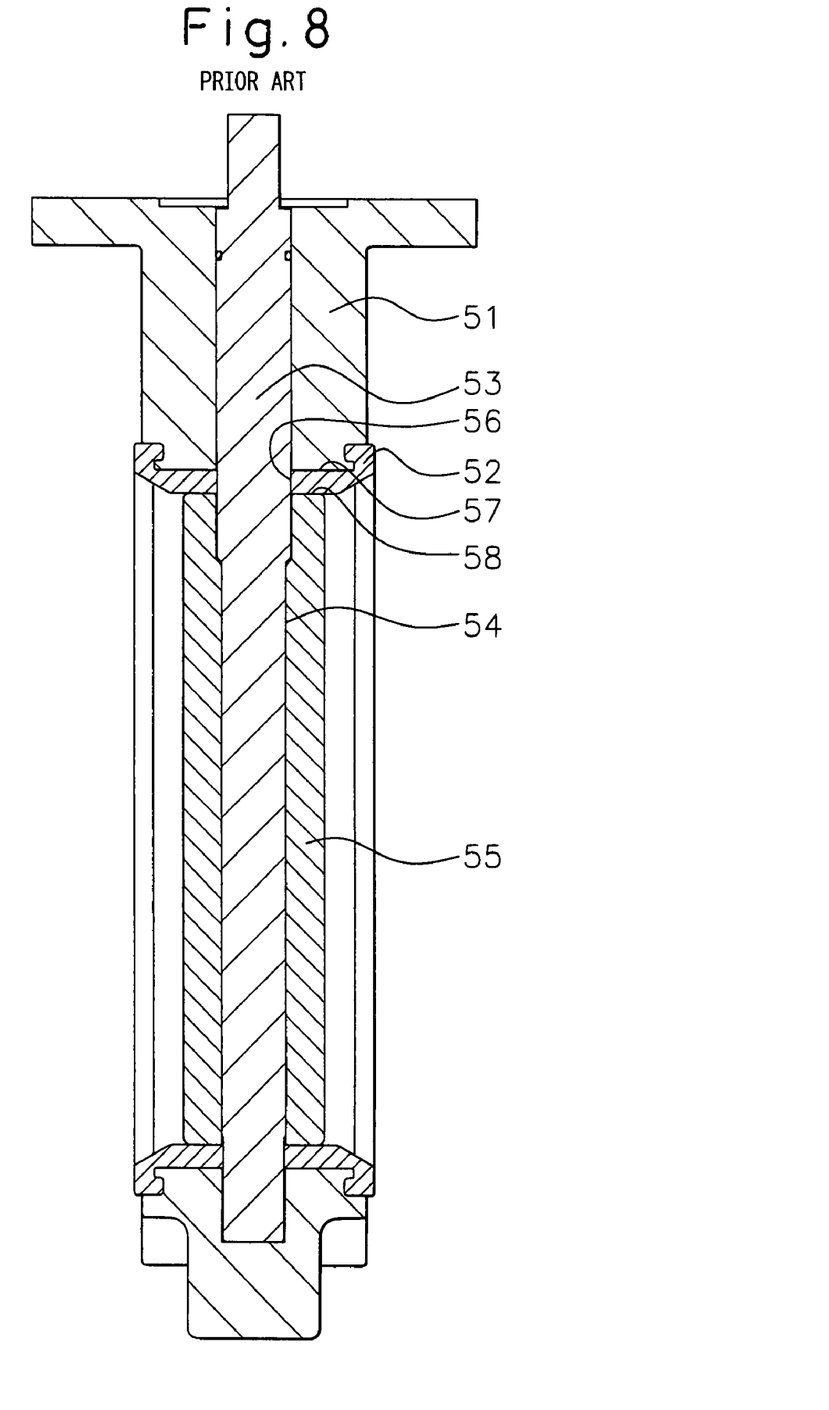
FIG. 8 is a longitudinal sectional view of the conventional butterfly valve.
Figure 9:
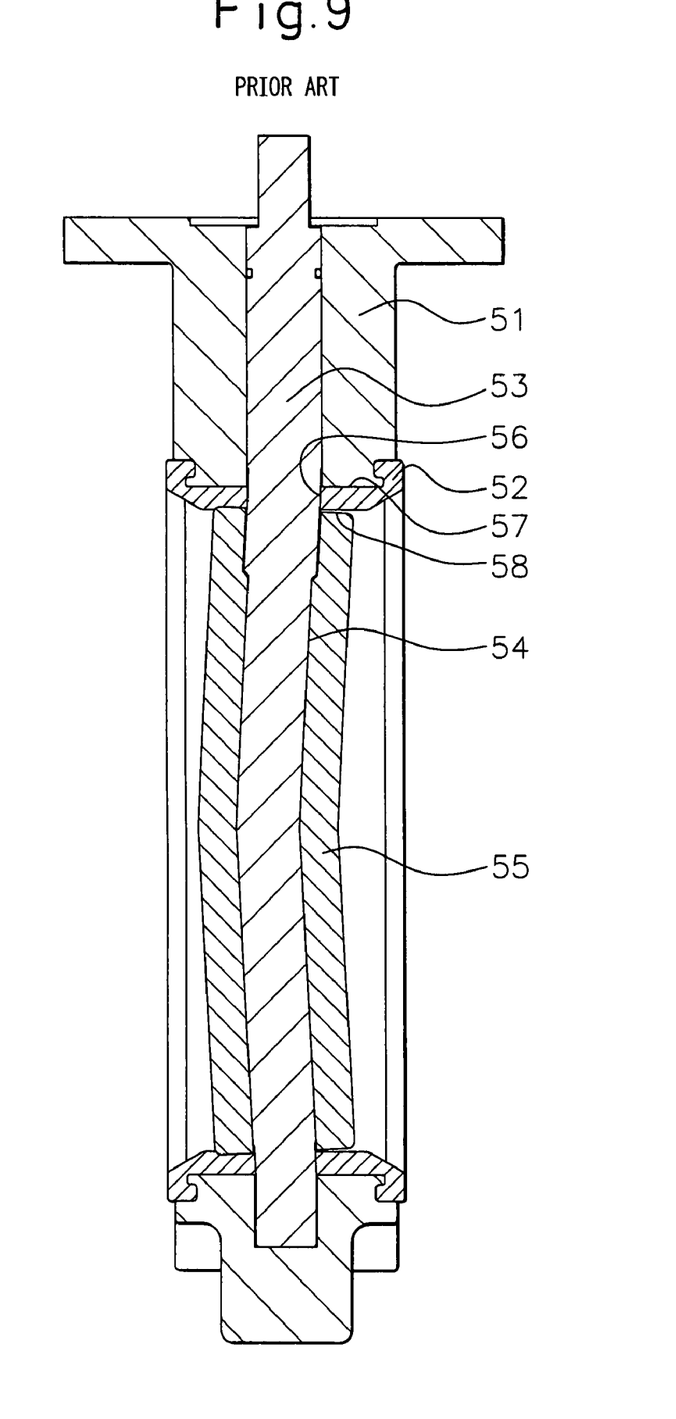
FIG. 9 is a longitudinal sectional view showing the state in which the valve disc is displaced by fluid pressure exerted on the upstream side thereof in FIG. 8.
Figure 10:
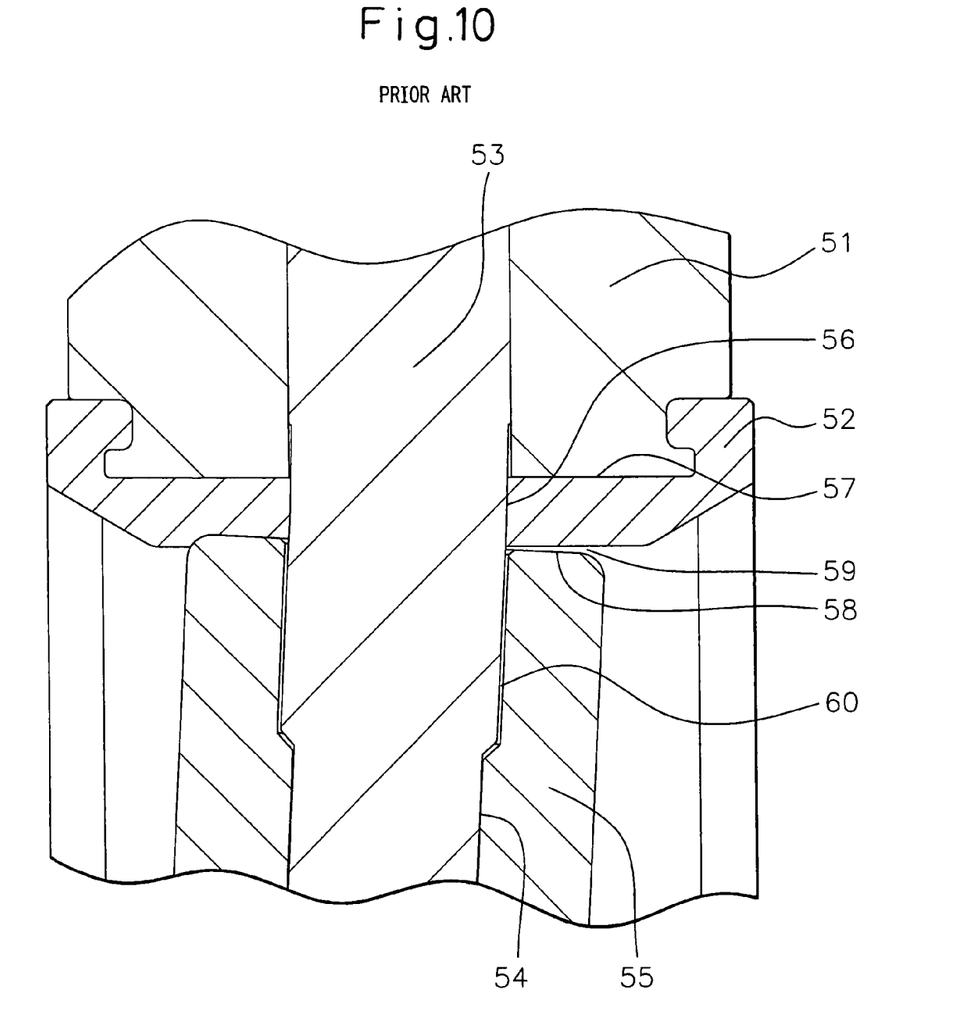
FIG. 10 is a longitudinal sectional view showing the essential parts of FIG. 8 in enlarged form.

A conventional butterfly valve of resin, as shown in FIG. 8, comprises a hollow cylindrical valve body 51, an annular seat ring 52 fitted to the inner peripheral surface of the valve body 51, a stem 53 supported on the valve body 51 through the seat ring 52 and a valve disc 55 supported by the stem 53 in a valve shaft hole 54 through the stem 53, wherein the valve disc 55 is rotated by the rotation of the stem 53 and pressed against or separated from the seat ring 52 thereby opening/closing the valve. In the process, with the increase of the bore diameter of the resin butterfly valve, stress is concentrated mainly on the intermediate portion in the axial direction of the stem of the valve disc 55 by the fluid pressure exerted with the valve closed, with the result that the displacement is caused from the intermediate portion (FIG. 9). This displacement undesirably separates the seat ring 52 and the outer peripheral edge 58 of the valve disc 55 on the upstream side (right side in FIG. 9) which otherwise normally would be in contact with each other under pressure. Thus, a gap 59 is generated (FIG. 10), and fluid may leak into the gap 60 between the valve shaft hole 54 and the stem 53 inside the valve disc. On the downstream side (left side in FIG. 9) free of the fluid pressure, a seal is formed with the valve disc 55 pressed strongly against the seat ring 52, and therefore, no fluid leaks from the valve even if leakage inside the valve disc occurs. Depending on the fluid, the stem 53 may corrode. Especially in the case where the fluid is corrosive which corrodes the metal stem 53 and may deteriorate the strength and endurance or destroy the valve. In the case where the shaft seal part 56 between the seat ring 52 and the stem 53 is not sufficiently sealed, the fluid leaks from the shaft seal part 56 after continuous operation under a high fluid pressure or over a long period of time. As a result, the fluid intrudes into the part 57 behind the seat ring, i.e. between the outer periphery of the seat ring 52 and the inner periphery of the valve body 51. Further, the stagnation of the fluid expands the seat ring 52 radially inward, thereby posing a problem in that operation torque is increased or the valve disc 55 cannot be closed.

In the case of a metal butterfly valve, though not to the extent of a resin butterfly valve, the valve disc 55 of a larger bore diameter is displaced more by the fluid pressure exerted during the closed state, and therefore, the leakage in the valve disc may occur from the gap 59 between the valve disc 55 and the seat ring 52. Also, like in the resin butterfly valve, the fluid may leak from the shaft seal part 56 between the seat ring 52 and the stem 53. Further, although the valve disc 55 of the metal butterfly valve is lined for use with a corrosive fluid, the portions into which the fluid leaks are not normally lined. Thus, the corrosive fluid corrodes the metal stem, thereby posing a problem that the strength and endurance of the valve may be deteriorated or the valve may be damaged.

Figure 11:
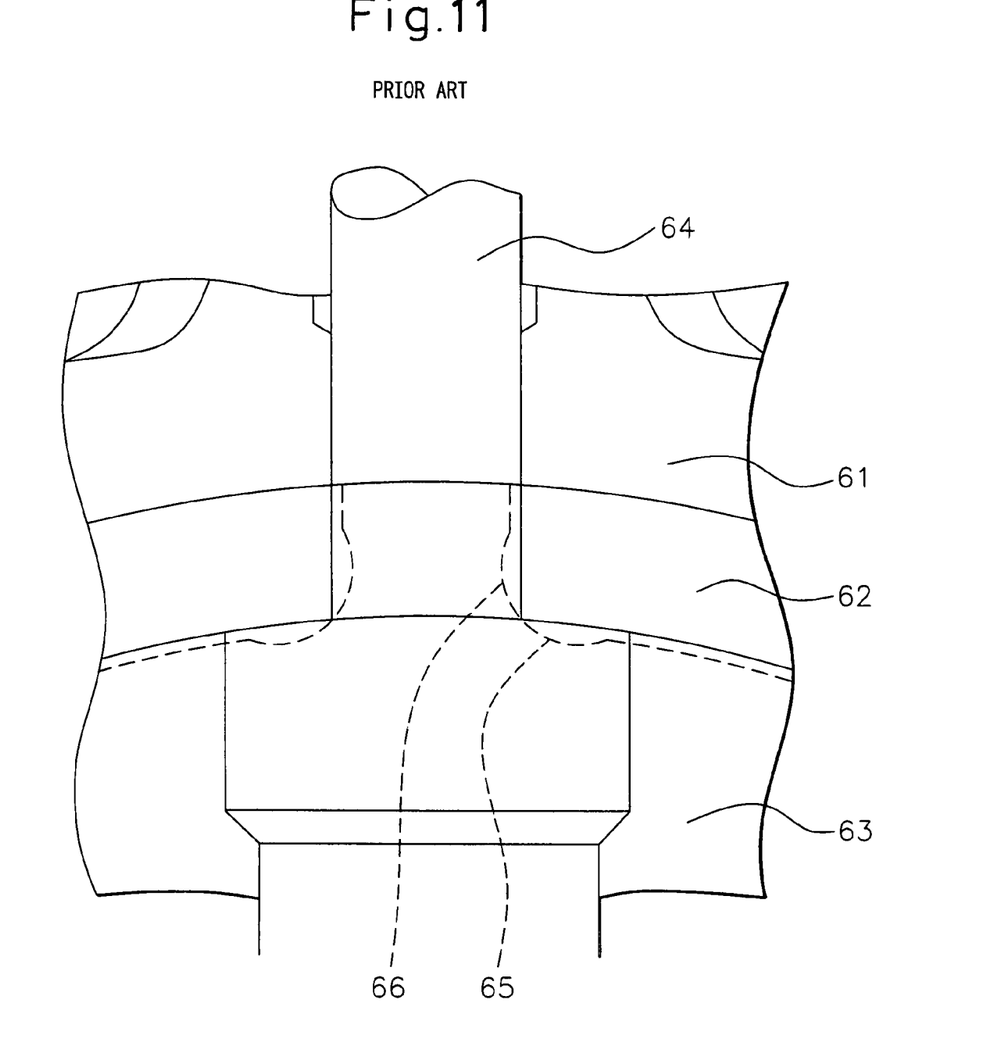
FIG. 11 is a diagram explaining the shape of the expanded portions and the seat contact pressure in the conventional butterfly valve.

As a solution to the problem of fluid leakage from the shaft seal part posed in the prior art described above, a shaft seal device of the seat ring is described in Japanese Patent No. 3389542 (pp. 1-3, FIG. 3). In this central-type butterfly valve, as shown in FIG. 11, a seat ring 62 of an elastic material is attached to the whole inner peripheral surface of a valve body 61 through which a hollow cylindrical fluid path is formed, and a discal valve disc 63 with the outer peripheral surface thereof adapted to come into or out of contact with the seat ring 62 is rotatably journaled by a valve rod 64. This central-type butterfly valve is characterized by an expanded portion 65 integrated with the seat ring 62 and extended from the inner peripheral surface of the seat ring 62 in parallel to the axial line of the valve rod 64 of the seat ring 62 radially inward of the valve body 61 without insertion of a rigid member such as a ring, and an expanded portion 66 integrated with the seat ring 62 and extended inward from the inner peripheral surface of the insertion hole for the valve rod 64 in the direction orthogonal to the axial line of the valve rod 64. The advantage of this central-type butterfly valve is that fluid leakage along the axial line of the valve rod 64 can be positively prevented by increasing the compression rate of the expanded portions 65, 66 as compared with the other parts.

In the shaft seal device for the seat ring described above, the valve rod 64 and the seat ring 62 are sufficiently sealed by the expanded portions 65, 66, and therefore, fluid leakage in the direction along the valve rod axis between the valve rod 64 and the seat ring 62 is prevented. In the case where the valve disc 63 is displaced by fluid pressure exerted when the valve is closed, as shown in FIG. 11, the sealing capacity of the expanded portion 65 is insufficient, so that a gap develops between the seat ring 62 and the valve disc 63 and the fluid may leak into the mounting portion of the valve rod 64 and the valve disc 63 from the gap in the valve disc 63 (hereinafter referred to as the valve disc internal leakage). This can be improved by enlarging the expanded portion 65. However, an increased size of the expanded portion 65, makes it difficult to assemble the valve and poses the problem of increased torque of the valve rod 64. Also, the expanded portion 65 is kept strongly deformed between the valve disc 63 and the valve body 61. Although no problem occurs over a short period of time, continuous opening/closing (on/off) in a protracted use may buckle the deformed expanded portion 65, resulting in lower sealability. Thus, the fluid may leak downstream, or internal leakage may occur in the valve disc, thereby leading to the problem that the valve rod 64 may corrode.

SUMMARY OF THE INVENTION

This invention has been achieved in view of the problems of the prior art described above, and the object thereof is to provide a butterfly valve wherein internal valve disc leakage is prevented in the case where the valve disc is displaced by fluid pressure by a butterfly valve closed thereby preventing fluid from leaking from the shaft seal part between the stem and the through holes of the seat ring, and wherein the operation torque of the stem is not increased and no fluid leakage occurs over a long period of time operation.

In order to achieve the object described above, according to this invention, there is provided a butterfly valve comprising a seat ring fitted to the inner peripheral surface of a hollow cylindrical valve body, a stem supported on the valve body via through holes of the seat ring and a discal valve disc supported with the stem mounted in the valve shaft hole, wherein the valve disc is opened/closed by being rotated with the rotation of the stem, wherein an annular protrusion having a tapered surface with the outer periphery inclined from the direction of the valve axis is formed radially inward on the peripheral edge of the through holes on the inner periphery of the seat ring, and wherein a bowl-shaped annular depression engaged with the tapered surface is formed on the inner periphery of the opening end of the valve shaft hole of the valve disc.

The outer periphery of the annular protrusion of the seat ring is preferably formed with a boss kept in pressure contact with the valve disc, and the contact surface of the boss is preferably spherically concave.

The neighborhood of the through holes on the outer periphery of the seat ring is preferably formed with a ring of a stiff material.

The inner periphery of the through holes of the seat ring is preferably formed with an annular protrusion.

The valve body and the valve disc are preferably formed of a synthetic resin.

The valve disc can be rotated manually, pneumatically or electrically.

BRIEF DESCRIPTION OF THE DRAWINGS

The above and other objects, features and advantages will be made apparent by the description of preferred embodiments taken in conjunction with the accompanying drawings.

DETAILED DESCRIPTION OF THE INVENTION

A first embodiment of the invention will be explained below with reference to the drawings, and the invention is not of course limited to this embodiment.

The configuration of this invention is described with reference to FIGS. 1 to 3. The butterfly valve according to a first aspect of the invention comprises a seat ring 1 fitted on the inner peripheral surface of a hollow cylindrical valve body 3, a stem 4 supported on the valve body 3 via through holes 9, 10 of the seat ring 1, and a discal valve disc 2 with the stem 4 mounted and supported in the valve shaft hole 16, wherein the valve disc 2 is rotated with the rotation of the stem 4 thereby to perform the open/close (on/off) operation. An annular protrusion 13 having a tapered surface 12 with the outer periphery thereof inclined with respect to the valve axis is formed radially inward of the peripheral edge portion of each of the through holes 9, 10 on the inner periphery of the seat ring 1, and a bowl-shaped annular depression 17 engaged with the tapered surface 12 is formed on the inner periphery at the opening end of the valve shaft hole 16 of the valve disc 2.

According to a second aspect of the invention, the outer periphery of the annular protrusion 13 of the seat ring 1 is formed with a boss 14 kept in pressure contact with the valve disc 2, and the contact surface of the boss 14 is formed in the shape of a spherical concave.

According to a third aspect of the invention, a ring 15 of a stiff material is arranged around each of the through holes 9, 10 on the outer periphery of the seat ring 1.

According to a fourth aspect of the invention, an annular protrusion 11 is formed on the inner periphery of each of the through holes 9, 10 of the seat ring 1.

According to a fifth aspect of the invention, the valve body 3 and the valve disc 2 are formed of synthetic resin.

According to a sixth aspect of the invention, the valve disc is driven pneumatically or electrically or rotated manually.

According to this invention, the shape of the annular protrusion 13 of the seat ring 1 is not specifically limited and may be a cone or a truncated cone as long as it is configured to have the tapered surface 12 with the outer periphery thereof inclined with respect to the valve axis. In order to facilitate assembly work without increasing the operation torque of the butterfly valve, the shape of a truncated cone is more preferable. Also, the tapered surfaces 12, 18 of the seat ring 1 and the valve disc 2 may be in a gently curved spherical form.

Also, the tapered surface 12 of the annular protrusion 13 of the seat ring 1 is inclined at an angle preferably in the range of 20° to 400, or more preferably in the range of 25° to 35° with respect to the plane perpendicular to the axis of the stem 4. Similarly, the tapered surface 18 of the annular depression 17 of the valve disc 2 is inclined at an angle preferably in the range of 25° to 45°, or more preferably in the range of 30° to 40° with respect to the plane perpendicular to the axis of the stem 4. Taking the sealability of the seat ring 1 and the valve disc 2 into consideration, the larger the taper angle, the higher the sealability, and in order to secure the required sealability, the tapered surface 12 is desirably inclined at an angle larger than 20° and the tapered surface 18 larger than 25°. In order to avoid the difficulty of centering during assembly due to an excessively large taper angle, the angle of the tapered surface 12 is preferably smaller than 400, and the angle of the tapered surface 18 preferably smaller than 45°. The taper angle of the tapered surface 18 of the valve disc 2 is preferably about 5° larger than the taper angle of the tapered surface 12 of the seat ring 1, and as long as the tapered surface 18 of the valve disc 2 is about 5° larger than the angle of the tapered surface 12 of the seat ring 1, the annular protrusion 13 is not pressed against the annular depression more strongly than necessary, therefore sealability can be maintained over a long period of time.

Also, in view of the fact that the annular protrusion 13 is fitted in the annular depression 17 during assembly, the valve disc 2 and the seat ring 1 can be centered on each other, thereby facilitating the valve assembly. Further, by fitting the annular protrusion 13 in the annular depression 17, the seat ring 1 is prevented from being strongly deformed between the valve disc 2 and the valve body 3, and therefore torque is not increased. Thus, a reduction in sealability is avoided which otherwise might be caused by the buckling of the strongly deformed portion over a long period of time.

The thrust surface in the neighborhood of the outer periphery of the annular protrusion 13 of the seat ring 1 may be formed with a boss 14 kept in pressure contact with the opening end surface of the valve shaft hole 16 of the valve disc 2 regardless of whether the valve is open or closed. In the case where the contact surface of the boss 14 in contact with the opening end surface of the valve shaft hole 16 of the valve disc 2 is formed in the shape of a spherical concave complementary with the opening end surface of the valve shaft hole 16, the valve disc 2 is rotated smoothly and the sealability of the valve seat is improved without increasing the torque.

Also, a ring 15 of a stiff material may be arranged around each of the through holes 9, 10 on the outer periphery of the seat ring 1, in order to prevent the through holes 9, 10 of the seat ring 1 from being decentered by stress exerted to deform the seat ring 1, in the case where the valve disc 2 is displaced under the fluid pressure. As a result, the reduction in sealability of the shaft seal part 21 and the fluid leakage under a high pressure are prevented. Thus, sealability over a long period of time between the stem 4 and the through holes 9, 10 of the seat ring 1 can be suitably maintained. Incidentally, the ring 15 may be formed of any stiff material, that is capable of securing strength sufficient to maintain the sealability. Therefore, the material may be a metal such as cast iron, cast steel, carbon steel, stainless steel or titanium, or synthetic resin such as polyvinyl chloride (hereinafter referred to as PVC), polypropylene (hereinafter referred to as PP), polyvinylidene fluoride (hereinafter referred to as PVDF), polyethylene (hereinafter referred to as PE), polyphenylene sulfide (hereinafter referred to as PPS), polydicyclopentadiene (hereinafter referred to as PDCPD) or FRP. Among these materials, cast stainless steel such as SCS13 is preferable for its high corrosion resistance, low cost and high productivity.

Also, an annular protrusion 11 may be formed on the inner periphery of each of the through holes 9, 10 of the seat ring 1, as the provision of the annular protrusion 11 and the resulting concentration of the seal portion by linear contact between the seat ring 1 and the stem 4 suitably improves the sealability of the shaft seal part 21 of the stem 4 and the seat ring 1. Further, the annular protrusion 11 coupled with the ring 15 further improves sealability.

Materials usable for the valve disc 2 and the valve body 3 according to the invention include PVC and PP. As long as the strength and the characteristics required for the butterfly valve are satisfied, a synthetic resin such as PVDF, PE, PPS, PDCPD or FRP or metal such as stainless steel, copper, cast iron or cast steel may alternatively be used. Among these materials, the valve body 3 and the valve disc 2 may be preferably formed of a synthetic resin. This invention is suitable especially for valves having a large bore diameter. A valve made of resin, compared with a valve made of metal, is much lighter in weight and higher in operating efficiency, and can be used with a corrosive fluid without any problem.

The material of the stem 4 according to the invention, though not specifically limited as long as sufficient in strength, may be cast iron, cast steel, carbon steel, stainless steel or titanium. The material of the seat ring 1 according to the invention, though not specifically limited as long as it is sufficient in strength and corrosion resistance, is preferably any elastic material including EPDM, NBR or rubber such as fluorine-containing rubber or synthetic resin such as PVDF.

The butterfly valve according to the invention is mainly driven, though not specifically limited, manually by a handle mounted directly at an end of the stem 4 projected from the valve body 3 or a handle mounted through a gear box. As an alternative, a pneumatic drive system using air pressure (FIG. 7) or an electric drive system with a motor (not shown) may be employed with equal effect.

In FIGS. 1 to 6, reference numeral 1 designates a seat ring of EPDM, in which a hollow cylindrical body 5 and flange surfaces 6 on both sides of the body 5 are formed integrally with each other. An annular protrusion 7 having a rectangular cross section is formed at the central part of the outer periphery of the body 5 and fitted in the fitting groove formed on the inner peripheral surface of the valve body 3 described later not to move the seat ring 1. The outer periphery of each flange surface 6 is formed in the shape of a circle and a lug 8 protruded inward from the upper end of each flange surface 6 is fitted in the fitting groove formed on each end surface of the valve body 3 not to move the seat ring 1.

The body 5 of the seat ring 1 is formed with through holes 9, 10, at the upper and lower parts of the stem 4 for passing the stem 4 therethrough. The inner periphery of each of the through holes 9, 10 is formed of an annular protrusion 11 having a semicircular cross section projected radially inward of the through holes 9, 10. The inner periphery of the seat ring 1 is formed in the shape of a circle as a flat surface, while an annular protrusion 13 having a tapered surface 12 with the outer periphery thereof inclined with respect to the valve axis protrudes radially inward from the peripheral edge of the through holes 9, 10. The annular protrusion 13 is in the shape of a truncated cone, and the tapered surface 12 is formed at an angle of 30° to the plane perpendicular to the axis of the stem 4. A boss 14 kept in pressure contact with the valve disc 2 is formed on the outer periphery of the annular protrusion 13 of the seat ring 1. The boss 14 has the contact surface thereof formed in the shape of a spherical concave conforming with the shape of the valve disc 2 for an improved valve seat sealability. Also, a ring 15 of SCS13 is fitted around the through holes 9, 10 on the outer periphery of the seat ring 1.

The circular valve disc 2 of PP is arranged at the central part inside the valve body 3 described later. The valve shaft hole 16 formed through the valve disc 2 is formed at the central part of the valve disc 2, and the stem 4 is fixedly arranged through the valve shaft hole 16, so that the valve disc 2 is supported by the stem 4. The inner periphery of the opening end portion of the valve shaft hole 16 of the valve disc 2 is formed with a bowl-shaped annular depression 17. The tapered surface 18 of the annular depression 17 is formed at an angle of 35° to the plane perpendicular to the axis of the stem 4, and the edge portion 23 forming the boundary between the tapered surface 18 and the outer peripheral edge 19 of the valve disc 2 is appropriately curved. The annular depression 17 of the valve disc 2 and the annular protrusion 13 of the seat ring 1 are assembled in such a manner that the annular protrusion 13 is fitted in the annular depression 17. With the rotation of the stem 4, the valve disc 2 rotates inside the valve body 3, so that the outer peripheral edge 19 of the valve disc 2 is pressed against or separated from the inner periphery of the seat ring 1 thereby to open/close the valve.

Reference numeral 3 designates a hollow cylindrical valve body of PP and has the upper part thereof formed with a substantially discal top flange 20 projected from the outer periphery. The seat ring 1 is fitted on the inner peripheral surface of the valve body 3. The central part of the inner peripheral surface of the valve body 3 is formed with a fitting groove to receive the annular protrusion 7 formed at the central part of the outer periphery of the seat ring 1. A fitting groove fitted with the lug 8 of the seat ring 1 is formed around the opening of each end surface of the valve body 3.

Reference numeral 4 designates a stem of SUS403 and supported by the valve body 3. The upper end portion of the stem 4 is projected from the central part of the top flange 20 formed at the upper part of the valve body 3. The central part of the stem 4 is closely and rotatably inserted through the valve body 3 and the seat ring 1.

Next, a pneumatically-driven butterfly valve according to a second embodiment of the invention will be explained.

Figure 7:
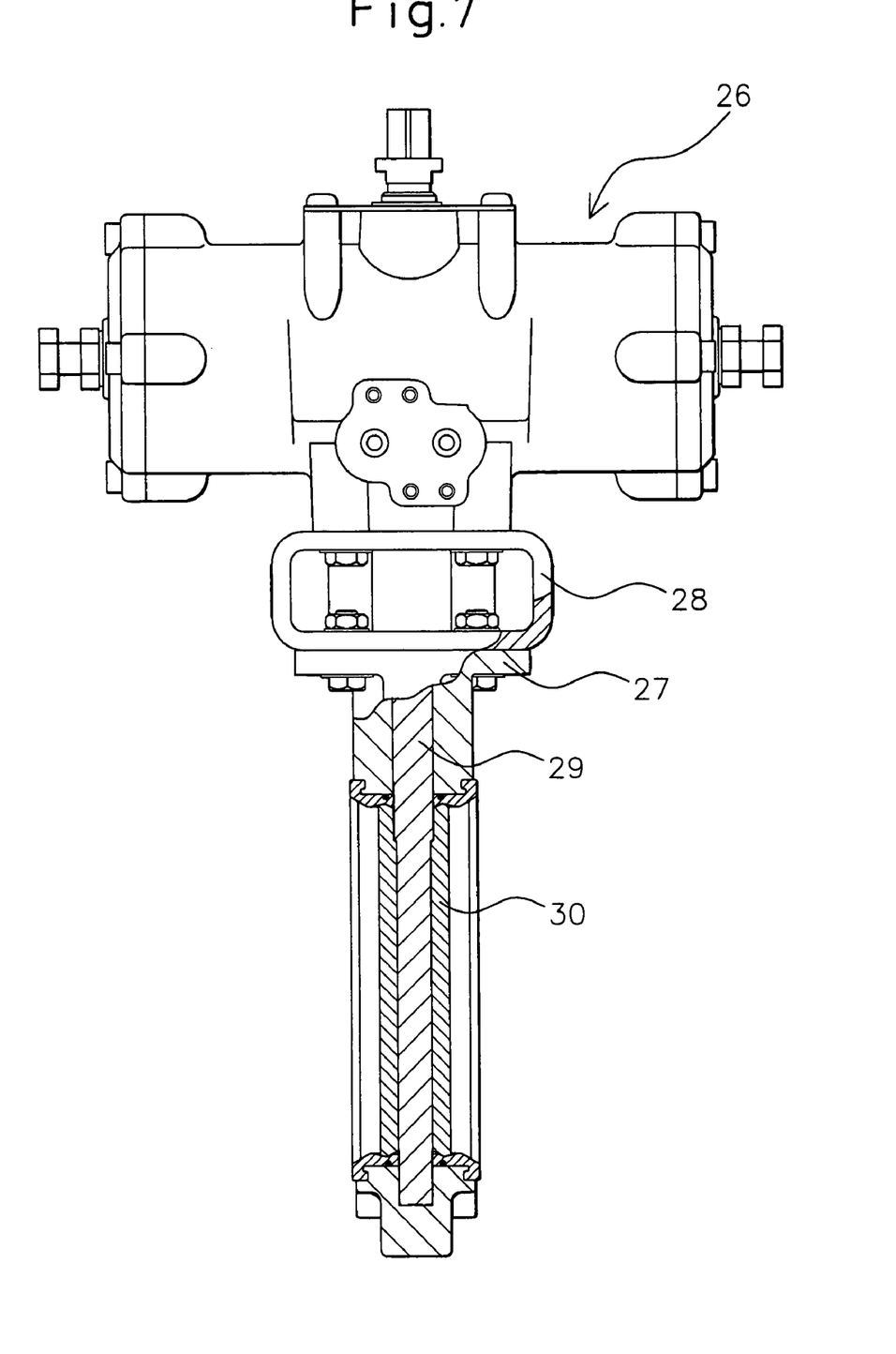
FIG. 7 is a longitudinal sectional view showing the pneumatically-driven butterfly valve according to a second embodiment of the invention.

In FIG. 7, reference numeral 26 designates a pneumatic drive unit using air pressure, which is mounted on the top flange 27 of the butterfly valve through a mount 28. The drive force of the pneumatic drive unit 26 is transmitted to the upper part of the stem 29 and rotates the stem 29, so that the valve disc 30 is rotated thereby opening/closing the valve. Incidentally, an electric drive unit including a motor or the like may be used in place of the pneumatic drive unit 26. In such a case, the electric drive unit is mounted on the butterfly valve through the mount.

Next, the operation of the butterfly valve according to the first embodiment closed up with the fluid pressure applied to the upstream side thereof will be explained.

With the rotation of the stem 4 from the full-open state of the valve, the valve disc 2 is also rotated, and the outer peripheral edge 19 of the valve disc 2 is pressed against the inner periphery of the seat ring 1 to close up the valve (state shown in FIG. 1), so that the valve seat is sealed by the inner periphery of the seat ring 1 and the outer peripheral edge 19 of the valve disc 2. In the process, the neighborhood of the valve shaft hole 16 of the outer peripheral edge 19 of the valve disc 2 is sealed by being kept pressed against the boss 14 on the one hand and by the annular protrusion 13 of the seat ring 1 and the annular depression 17 of the valve disc 2 at the same time. With this configuration, the double seal structure with the contact surface of the boss 14 and the tapered surface 12 of the annular protrusion 13 prevents the fluid from leaking into the gap 25 between the stem 4 and the valve shaft hole 16 of the valve disc 2 (hereinafter sometimes referred to as the valve disc internal leakage). Even in the case where the valve disc 2 is displaced under fluid pressure with stress applied to deform the seat ring 1, the provision of the ring 15 prevents the through holes 9, 10 of the seat ring from being decentered, and therefore, the sealability of the shaft seal part 21 between the seat ring 1 and the stem 4 is not deteriorated. Further, since the sealability with the stem 4 is improved by the annular protrusion 11, positive seal is assured. As a result, the fluid is prevented from leaking into the seat ring back 22, i.e. the gap between the outer periphery of the seat ring 1 and the inner periphery of the valve body 3 from the shaft seal part 21.

Figure 1:
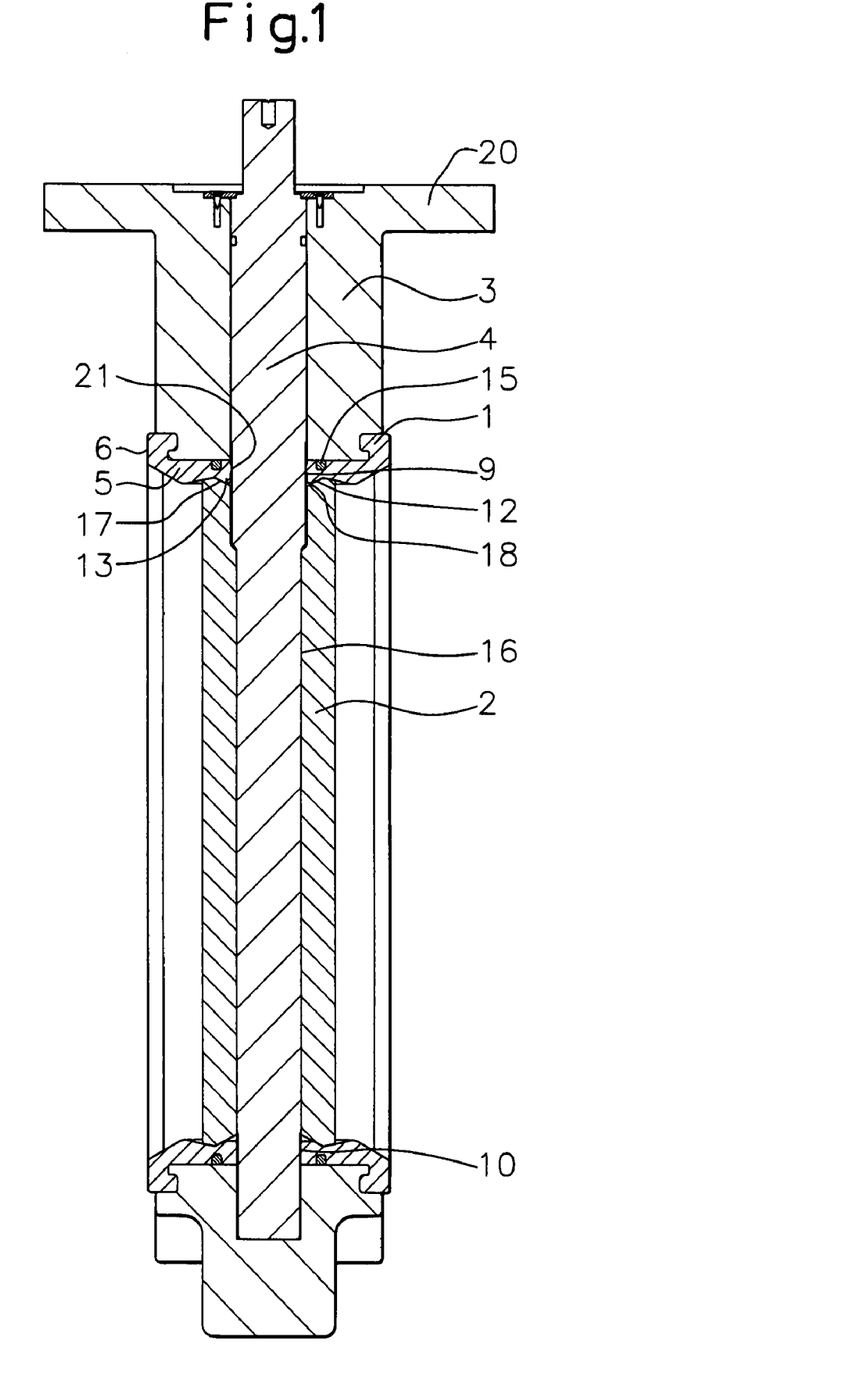
FIG. 1 is a longitudinal sectional view showing the closed-up state of the butterfly valve according to a first embodiment of the invention.
Figure 2:
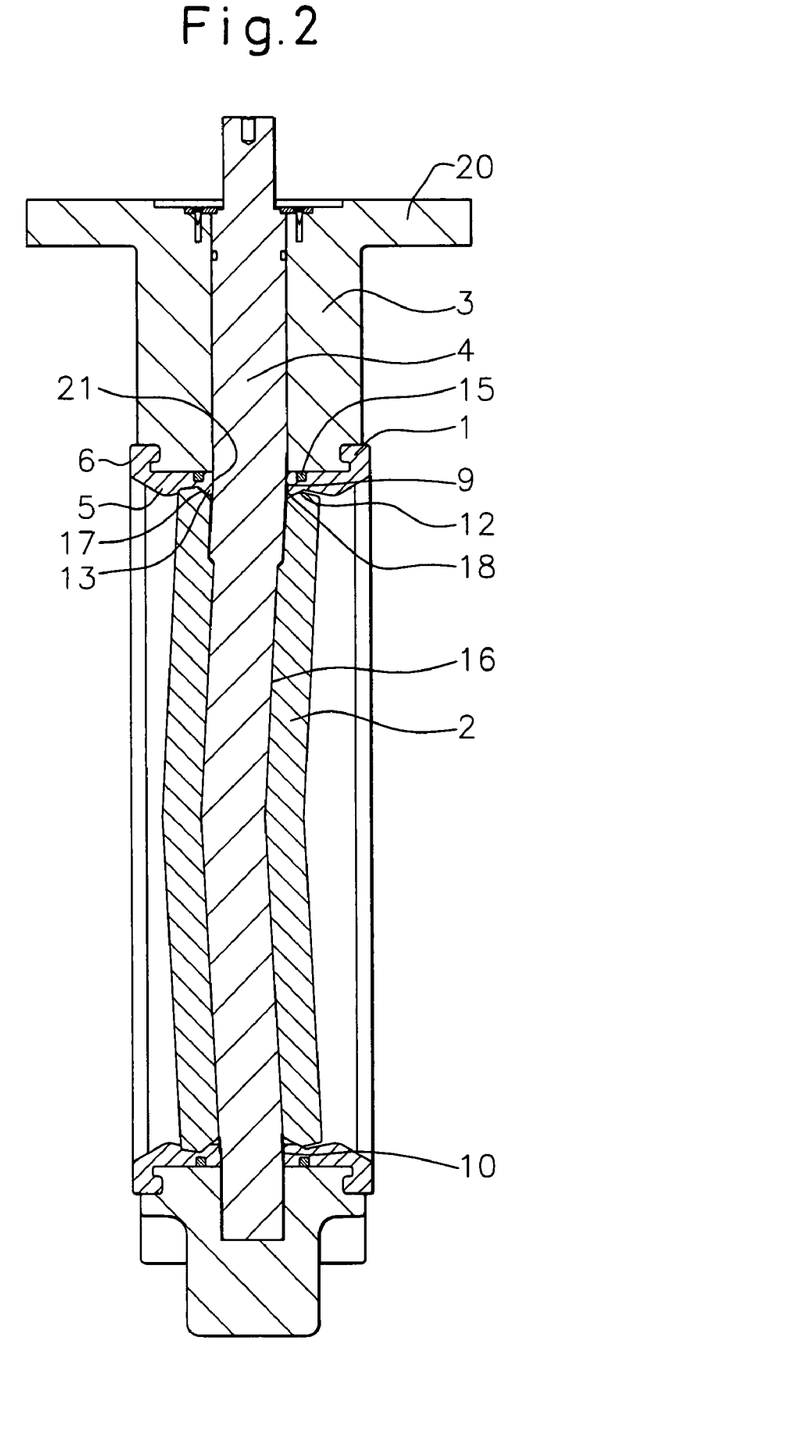
FIG. 2 is a longitudinal sectional view showing the state in which the valve disc is displaced by fluid pressure exerted on the upstream side thereof in FIG. 1.
Figure 3:
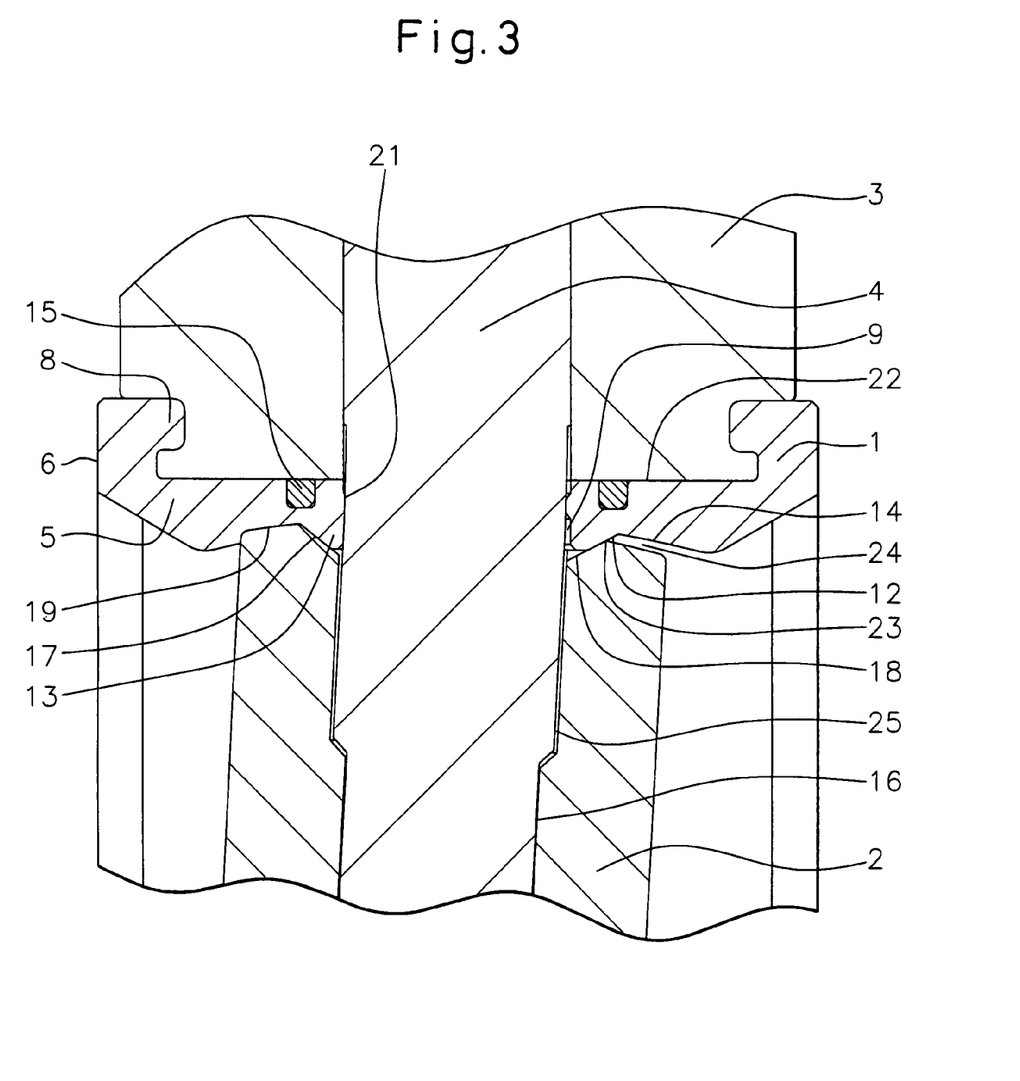
FIG. 3 is a longitudinal sectional view showing the essential parts of FIG. 2 in enlarged form.
Figure 4:
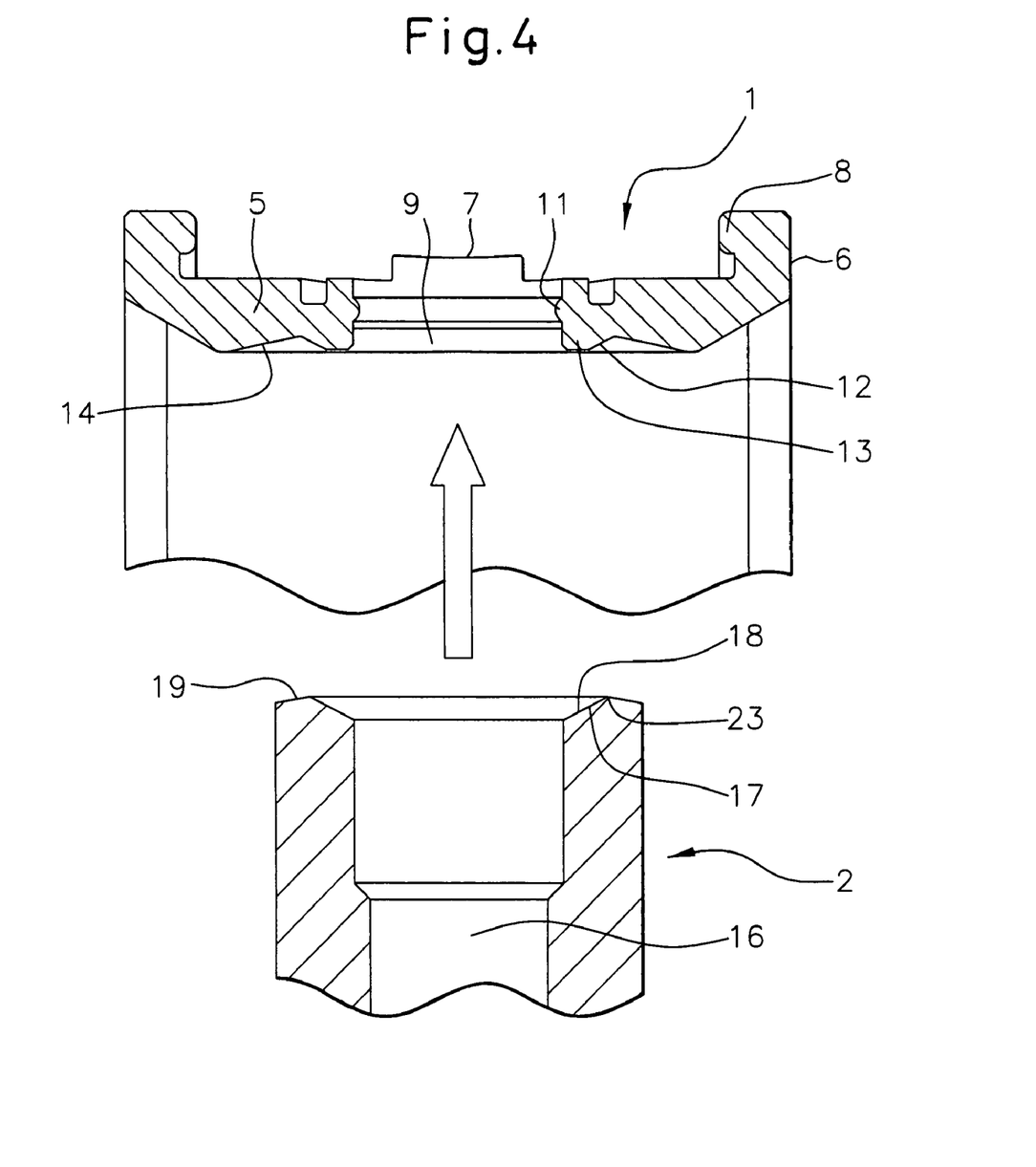
FIG. 4 is a longitudinal sectional view showing the essential parts of the seat ring and the valve disc in enlarged form according to this invention.
Figure 5:
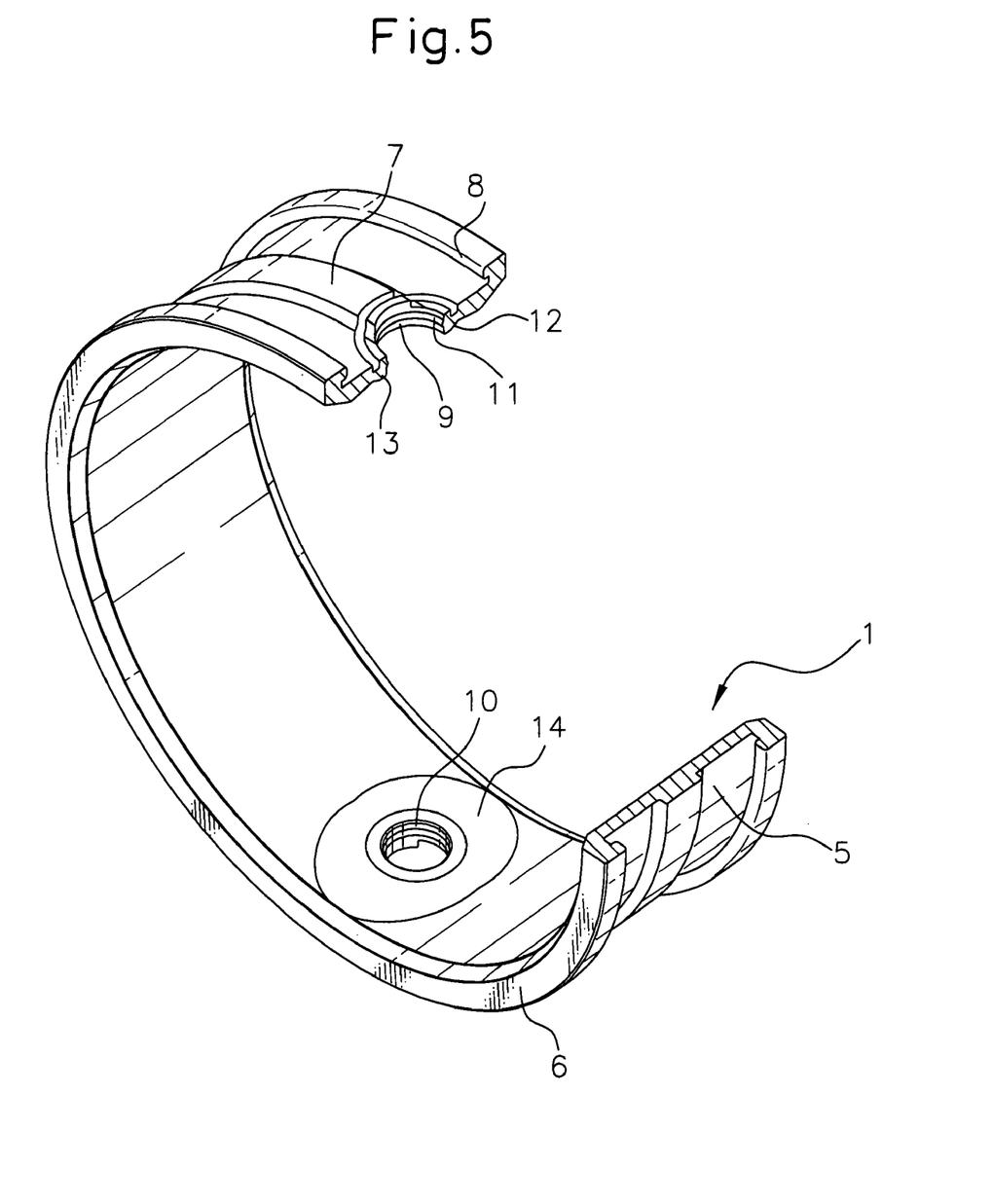
FIG. 5 is a partly cutaway perspective view showing the seat ring of the butterfly valve according to this invention.
Figure 6:
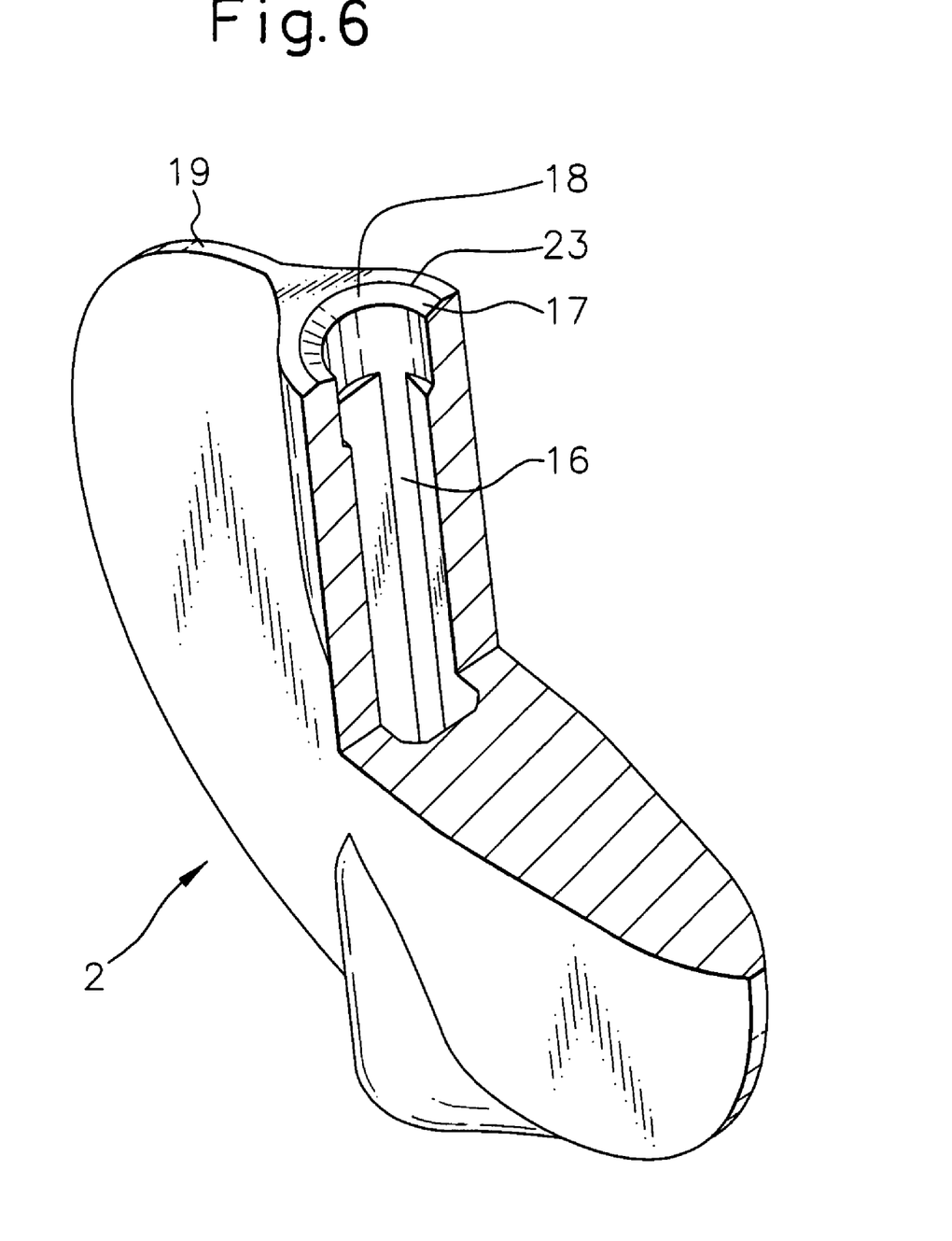
FIG. 6 is a partly cutaway perspective view showing the valve disc of the butterfly valve according to the invention.

In the case where the fluid pressure is exerted on the upstream side (right side in FIG. 1) from the state shown in FIG. 1, stress is concentrated mainly on the intermediate portion of the valve disc along the direction of the axis of the stem 4, and the displacement is caused mainly at the particular intermediate portion (state shown in FIG. 2). This displacement increases with the bore diameter of the valve. Due to this displacement, the outer peripheral edge 19 of the valve disc 2 on the upstream side (right side in FIG. 2) and the boss 14 of the seat ring 1 which are normally pressed against each other are separated from each other, thereby generating a gap 24 (FIG. 3). The displacement of the valve disc 2, however causes the edge portion 23 of the valve disc 2 to bite into the tapered surface 12 of the annular protrusion 13 of the seat ring 1, and the tapered surface 12 of the seat ring 1 is pressed against the tapered surface 18 of the valve disc 2 thereby to form a seal. Thus, internal valve disc leakage is prevented, and so is corrosion of the stem by the fluid. On the other hand, on the downstream side, the displacement of the valve disc 2 causes the outer peripheral edge 19 of the valve disc 2 to bite into the boss 14, and the tapered surfaces 12, 18 to form a double seal. Even in the case where the valve disc 2 is displaced, no fluid leaks to the downstream side, and the displacement, if any of the shaft seal part has substantially no effect on the sealability.

Next, the sealability of the valve seat and the endurance of the butterfly valve according to the invention operated continuously was evaluated by the test method described below.

(1) Valve Seat Sealability Test

In accordance with the valve seat sealability test method specified in JIS B2032, water pressure of 0.83 MPa or 1.1 times higher than the maximum tolerable pressure was applied for one minute on the upstream side with the valve closed, and then the valve was visually checked for downstream leakage, and internal valve disc leakage and the leakage of the shaft seal part 21. Specifically, with regard to the downstream leakage, leakage at the seal portion between the valve disc 2 and the seat ring 1 was checked, and fluid leakage with regard to internal leakage valve disc, was checked from a hole formed from the downstream side at the central part of the valve disc 2. Further, the leakage at the shaft seal part 21 was checked from the expansion of the radially inner side of the seat ring 1 due to the water intrusion into the seat ring back 22.

(2) Endurance Test

With the endurance test method according to JIS B2032 as a reference, the fully-opened state and the closed-up state of the valve were repeatedly alternated using water at normal temperature without applying water pressure thereto. At each 10,000 session of this open/close operation, the sealability test described above was conducted until a total of 100,000 open/close operations were reached.

Embodiment 1

A valve seat leakage test and an endurance test were conducted on the butterfly valve having the bore diameter of 350 mm according to the first embodiment of the invention having so configured that the annular protrusion 13 having the tapered surface 12 with the outer periphery inclined with respect to direction of the valve axis is formed on the seat ring 1, the bowl-shaped annular depression 17 is formed on the valve disc 2, the ring 15 is formed around each of the through holes 9, 10 on the outer periphery of the seat ring 1, the annular protrusion 11 is formed on the inner periphery of each of the through holes 9, 10, and the boss 14 having the contact surface in the shape of a spherical concave kept pressed against the valve disc 2 is formed on the outer periphery of the annular protrusion 13. The test result shown in Table 1, indicates that no leak "Good" has occurred, and that internal valve disc leakage "No Good" has occurred.

Comparative Example 1

In the first embodiment, the valve seat leakage test and the endurance test were conducted using a flat butterfly valve with the valve disc 2 having no annular depression 17. The test result in comparison with the embodiment is shown in Table 1.

Comparative Example 2

In the first embodiment, the valve seat leakage test and the endurance test were conducted using a flat butterfly valve having the valve disc 2 without the annular depression 17 and the seat ring 1 formed with an annular protrusion having a semicircular cross section in place of the annular protrusion 13. The test result in comparison with the embodiment and the first comparative example is shown in Table 1.

Comparative Example 3

In the first embodiment, the valve seat leakage test and the endurance test were conducted using a flat butterfly valve having a flat seat ring 1 without the annular protrusion 13 and the valve disc 2 without the annular depression 17. The test result in comparison with the embodiment and the first and second comparative examples is shown in Table 1.

on/off operations over a long period of time, with the result that the crushed portion is reduced in sealability and leakage occurs.

With regard to the sealability of the shaft seal part 21, no fluid leakage occurs due to the ring 15 being formed around each of the through holes 9, 10 on the outer periphery of the seat ring 1 and the annular protrusion 11 formed on the inner periphery of the through holes 9, 10. In the first embodiment, the valve disc 2 and the seat ring 1 are positively sealed with the configuration according to the invention, and therefore no fluid intrudes into the shaft seal part 21.

TABLE 1

Valve seat sealability test and endurance test

|  |  | Embodiment 1 | Comparative example 1 | Comparative example 2 | Comparative example 3 |
|---|---|---|---|---|---|
| Valve seat sealability test | | Good | Good | Good | No Good |
| Endurance test | 10,000 times | Good | Good | No Good | — |
| | 20,000 times | Good | Good | — | — |
| | 30,000 times | Good | Good | — | — |
| | 40,000 times | Good | Good | — | — |
| | 50,000 times | Good | Good | — | — |
| | 60,000 times | Good | Good | — | — |
| | 70,000 times | Good | Good | — | — |
| | 80,000 times | Good | Good | — | — |
| | 90,000 times | Good | Good | — | — |
| | 100,000 times | Good | No Good | — | — |

As shown in Table 1, the first embodiment develops no fluid leakage after 100 thousand open/close (on/off) operations. The first to third comparative examples, on the other hand, develop internal valve unit leakage. From this result, according to the first embodiment in which the seat ring 1 has the annular protrusion 13 and the valve disc 2 the annular depression 17, as compared with the butterfly valve of the first and second comparative examples in which only the seat ring 1 has the annular protrusion 13 or the annular protrusion having a semicircular cross section or the third comparative example having no means for improving the sealability, the valve disc 2 and the seat ring 1 can be sealed without any problems even in the case where the valve disc 2 is displaced under a high fluid pressure, and further, sealability can be maintained for a long period of time without buckling the seat ring 1 even after repeatedly fully opening and closing the valve over a long period of time. According to the first embodiment, the valve disc develops no leakage and the stem 4 is not corroded by the fluid.

The comparison between the first comparative example and the second comparative example indicates that over a long period of time repeatedly fully opening and closing the valve, endurance is improved more with than without the annular protrusion 13. Therefore, with the configuration of the annular protrusion 13, sealability can be improved.

The comparison between the first embodiment and the first comparative example indicates that the annular protrusion 13 according to the first comparative example having no annular depression 17 is so configured as to be kept strongly deformed between the valve body 3 and the valve disc 2. This configuration, though having no problem regarding waterproofness in a short period of time, is known to cause the buckling of the deformed portion of the annular protrusion 13 after repeated The butterfly valve according to this invention with the structure described above has the following advantages:

(a) The provision of the annular protrusion on the seat ring and the provision of the annular depression on the valve disc prevents the internal valve disc leakage in which fluid leaks into the gap between the stem and the valve shaft hole of the valve disc even in the case where valve disc is displaced under the fluid pressure in the closed state of the butterfly valve, and therefore, the stem is prevented from being corroded by the fluid.

(b) The annular protrusion of the seat ring and the annular depression of the valve disc are assembled to fit each other which permits centering between the valve disc and the seat ring, and facilitates assembly. Further, in view of the fact that the seat ring 1 is not strongly crushed between the valve disc 2 and the valve body 3, the torque is not increased, and therefore, the sealability is not reduced after long-time use by the buckling of the otherwise strongly crushed portion.

(c) By forming the boss kept pressed against the valve disc on the outer periphery of the annular protrusion of the seat ring and forming the contact surface of the boss in a spherical concave, the rotation of the valve disc is smoothed and sealability improved without increasing the torque.

(d) The ring of a stiff material formed around the through holes on the outer periphery of the seat ring and the annular protrusion formed on the inner periphery of the through holes of the seat ring improves the sealability of the shaft seal part and prevents fluid leakage.

(e) No fluid leaks after a long period of repetitively fully opening and closing the valve, and therefore, sealability can be maintained over a long period of time.

(f) Since the valve body and the valve disc are formed of a synthetic resin, especially a butterfly valve, having a large bore diameter, is reduced in weight for improved workability and can be used without any corrosion problems even in applications involving a corrosive fluid.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A butterfly valve comprising a seat ring fitted to the inner peripheral surface of a hollow cylindrical valve body, a stem supported on the valve body via through holes of the seat ring and a discal valve disc supported with the stem mounted in a valve shaft hole of the valve disc, wherein the valve disc is opened/closed by being rotated with the rotation of the stem,
   wherein an annular protrusion having a first tapered surface with the outer periphery inclined from the direction of the valve axis is formed radially inward on the peripheral edge of each of the through holes on the inner periphery of the seat ring, the first tapered surface being inclined at an angle in the range of 20° to 40° with respect to a plane perpendicular to an axis of the stem,
   and wherein a bowl-shaped annular depression having a second tapered surface engaged with the first tapered surface is formed on the inner periphery of each opening end of the valve shaft hole of the valve disc, the second tapered surface being inclined at an angle in the range of 25° to 45° with respect to the plane perpendicular to the axis of the stem, the angle of the second tapered surface being larger than the angle of the first tapered surface.

2. The butterfly valve as set forth in claim 1, wherein the outer periphery of the annular protrusion of the seat ring is formed with a boss kept in pressure contact with the valve disc, and the contact surface of the boss is spherically concave.

3. The butterfly valve as set forth in claim 1, wherein the neighborhood of the through holes on the outer periphery of the seat ring is formed with a ring of a stiff material.

4. The butterfly valve as set forth in claim 1, wherein the inner periphery of the through holes of the seat ring is formed with an annular protrusion.

5. The butterfly valve as set forth in claim 1, wherein the valve body and the valve disc are formed of a synthetic resin.

6. The butterfly valve as set forth in claim 1, wherein the valve disc is rotated manually, pneumatically or electrically.

7. The butterfly valve as set forth in claim 1, wherein the angle of the second tapered surface is about 5° larger than the angle of the first tapered surface.

* * * * *